United States Patent [19]

Foxton et al.

[11] 4,440,037
[45] Apr. 3, 1984

[54] SHIFT CONTROL

[75] Inventors: Robert J. Foxton, Livonia; David A. Kappheim, Southfield; Russell C. Holmes, Troy, all of Mich.

[73] Assignee: Eaton Corporation, Cleveland, Ohio

[21] Appl. No.: 318,168

[22] Filed: Nov. 4, 1981

[51] Int. Cl.³ .......................... F16H 3/08; F16H 3/02; B60K 20/00; G05G 5/10
[52] U.S. Cl. .................................. 74/331; 74/473 R; 74/477; 74/745
[58] Field of Search ..................... 74/477, 473 R, 335, 74/745, 375, 331, 339

[56] References Cited

U.S. PATENT DOCUMENTS

| | | | |
|---|---|---|---|
| 2,932,988 | 4/1960 | Flynn et al. | 74/745 |
| 3,105,395 | 10/1963 | Perkins | 74/745 |
| 3,121,344 | 2/1964 | Fodrea | 74/473 R |
| 3,229,551 | 1/1966 | Stuckey | 74/745 |
| 3,335,616 | 9/1967 | Perkins | 74/331 |
| 3,648,546 | 3/1972 | McNamara et al. | 74/331 |
| 3,799,002 | 3/1974 | Richards | 74/745 |
| 3,921,469 | 11/1975 | Richards | 74/339 |
| 3,924,484 | 12/1975 | Richards | 74/331 |
| 3,945,458 | 3/1976 | Suzuki et al. | 74/477 |
| 3,983,979 | 10/1976 | Richards | 74/339 |
| 4,060,005 | 11/1977 | Bost | 74/745 |
| 4,132,122 | 1/1979 | Richards | 74/339 |
| 4,192,196 | 3/1980 | Bogema et al. | 74/339 |
| 4,194,410 | 3/1980 | Richards | 74/339 |
| 4,377,093 | 3/1983 | Janson | 74/473 R |

FOREIGN PATENT DOCUMENTS

1055952 6/1964 United Kingdom ............. 74/473 R

Primary Examiner—Allan D. Herrmann
Assistant Examiner—Bruce F. Wojciechowski
Attorney, Agent, or Firm—C. H. Grace; H. D. Gordon

[57] ABSTRACT

A shift control mechanism for a change speed transmission, or a change speed transmission section, having selectively axially movable gears, the selective axial movement of which is effective to cause engagement and disengagement of the axially moved gear, is provided. The shift control mechanism is utilized for a four speed transmission, or transmission section, and comprises a first shift fork fixed to a first shift rail, a second shift fork fixed to a second shift rail and a third shift fork fixed to a third shift rail. The shift rails are independently axially movable, the first and second shift rails are concentrically received in a first bore of a housing, the third shift rail is received in the second bore of a housing, and positive interlock means are provided to prevent simultaneous displacement of any two or more of the shift rails. The first shift fork will move a first gear from a neutral position in one axial direction only, the second shift fork will move a fourth gear from the neutral position thereof in the other axial direction only and the third shift fork will move the second and third gears jointly in both axial directions from the neutral positions thereof.

7 Claims, 7 Drawing Figures

| | A | B | C | D | E | F | G |
|---|---|---|---|---|---|---|---|
| LOW 106 | X | O | X | O | X | O | X |
| INT LOW 108 | X | O | X | X | X | X | X |
| INT HIGH 110 | X | O | X | X | X | O | O |
| DIRECT 112 | X | X | X | X | X | O | X |

Fig. 5     X = PRESSURIZED
              O = EXHAUSTED TO ATMOSPHERE

SHIFT CONTROL

BACKGROUND OF THE INVENTION

1. Field of the Invention

This invention relates to shift control mechanisms for a change speed transmission or transmission section, such as the auxiliary section of a compound transmission, having selectively axially movable gears, such as mainshaft gears, the selective axial movement of which is effective to cause engagement and disengagement of the axially moved gear with a shaft or a complementary gear. Preferably, the shift control mechanism is utilized for a constant mesh four speed transmission or transmission section, such as an auxiliary transmission section, having a remote master control or valve and a slave control and having four selectively axially movable constantly meshed gears which are selectively clutchable, one at a time, to a shaft by means of resiliently engageable, blocked jaw clutch structures.

2. Description of the Prior Art

Compound constant mesh transmissions of the splitter or range type, or a combination thereof, are well known in the prior art as may be seen by reference to U.S. Pat. Nos. 3,105,395; 3,648,546; 3,799,002; 2,932,988 and 3,229,551, all hereby incorporated by reference.

Blocked change gear transmissions of both the simple and the compound types which utilize selective axial movement of selectively axially movable constant mesh gears to cause engagement of the axially moved gear are also well known in the prior art as may be seen by reference to U.S. Pat. Nos. 3,799,002; 3,921,469; 3,924,484; 3,983,979; 4,192,196 and 4,194,410, all of which are hereby incorporated by reference.

Compound transmissions of the splitter type utilizing a main transmission section having axially fixed gears engaged by manual, nonsynchronized, nonblocked jaw clutch assemblies and a four speed splitter type auxiliary transmission section utilizing blocked resiliently shifted jaw clutch assemblies and selectively axially movable constantly meshed auxiliary section mainshaft gears are seen in copending application Ser. No. 287,470, filed July 27, 1981 and assigned to the assignee of this invention.

In the design of transmissions, particularly heavy duty transmissions, such as used in trucks, there has existed for a long time the problem of shifting the transmission to the various speed ratios, which problem is even greater when the transmission is compounded, that is provided with an auxiliary transmission section of the range or the splitter type for increasing the number of speed ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism, and to reduce its weight, space requirements and costs. Hence, without detracting in any way from the operability or desirability of many of the shifting mechanisms previously known, it may be stated that in the present invention these general objectives are accomplished to even a greater degree than has been previously possible.

Compound transmissions, such as the transmission disclosed in the above-mentioned copending application Ser. No. 287,470, filed July 27, 1981 and hereby incorporated by reference, utilizing a conventional nonsynchronized, nonblocked main section and a blocked auxiliary section is believed to be a highly desirable design. However, if the blocked auxiliary section is provided with a relatively large number of selectable speeds or ratios, such as four or more, the axial space requirements may become undesirably large as such auxiliary transmission sections typically utilized in a plurality of axially coupled pairs of mainshaft gears controlled by a single shift fork, or if separate shift forks and shift rails are provided the slave valve shift bar valve housing and required interlock structure may become unduly large or complicated. This is because the space required to allow axial shifting of a gear, such as a mainshaft gear, is often considerably greater than the space required to allow axial movement of a jaw clutch collar as typically utilized in a nonsynchronized, nonblocked (i.e. so called "clash type") transmission.

SUMMARY OF THE INVENTION

In accordance with the present invention a shifting mechanism for a change gear transmission or transmission section for selectively engaging any selected one of four selectable axially movable gears, one at a time, to a gear or shaft is provided which minimizes the axially required space of the transmission section and the size and complexity of the shift bar cylinder housing.

In the preferred form, the above is accomplished by providing a compound transmission, preferably of the splitter type, wherein the main transmission section is provided with well known nonsynchronized, unblocked jaw clutch assemblies and the auxiliary transmission section is provided with four axially movable constant mesh mainshaft gears and resiliently shiftable blocked jaw clutch assemblies. The above structure provides a relatively uncomplicated and reliable constant mesh compound transmission which is shiftable with substantially the ease of a simple transmission. Any one of the four auxiliary section mainshaft gears is clutchable, one at a time, to the mainshaft. The forwardmost of the auxiliary section mainshaft gears is controlled by a first shift fork on a first shift rod, the rearwardmost of the auxiliary section mainshaft gears is controlled by a second shift fork on a second shift rod. The intermediate two auxiliary mainshaft gears are axially interconnected for joint axial movement and are controlled by a third shift fork on a third shift rod. The first and second shift rods are concentric and telescopically supported and received in a first bore in the slave shift bar cylinder housing for independent axial movement. The third shift rod is received in a second bore in the slave shift bar cylinder housing. Various interlock means are provided to assure that only one auxiliary section mainshaft gear at a time may be axially moved to the engaged position thereof.

By providing independent axial movement of the forwardmost and reawardmost auxiliary section mainshaft gears, and by providing independently movable, concentric and telescopic first and second shift rods both received in a first bore in the auxiliary shift rod cylinder housing, the axial space requirements of the auxiliary transmission section and complexity and size of the auxiliary section shift control are minimized.

Accordingly, it is an object of the present invention to provide a new and improved shift control assembly for selectively axially moving a selected one of at least four selectively axially movable gears, one at a time only, which reduces the axial space requirements of the transmission housing and the complexity and/or size of the shift bar cylinder housing.

These and other objects and advantages of the present invention will become apparent from a reading of the detailed description of the preferred embodiment taken in view of the accompanying drawings.

DESCRIPTION OF THE PREFERRED EMBODIMENT

Referring now to the apparatus in detail, it will be recognized that a detailed disclosure of both the construction and operation of blockers and of blocked or semi-blocked transmissions utilizing same as has been set forth and claimed in the above mentioned patents and reference is therefore made thereto for such details.

Figures 1, 2:
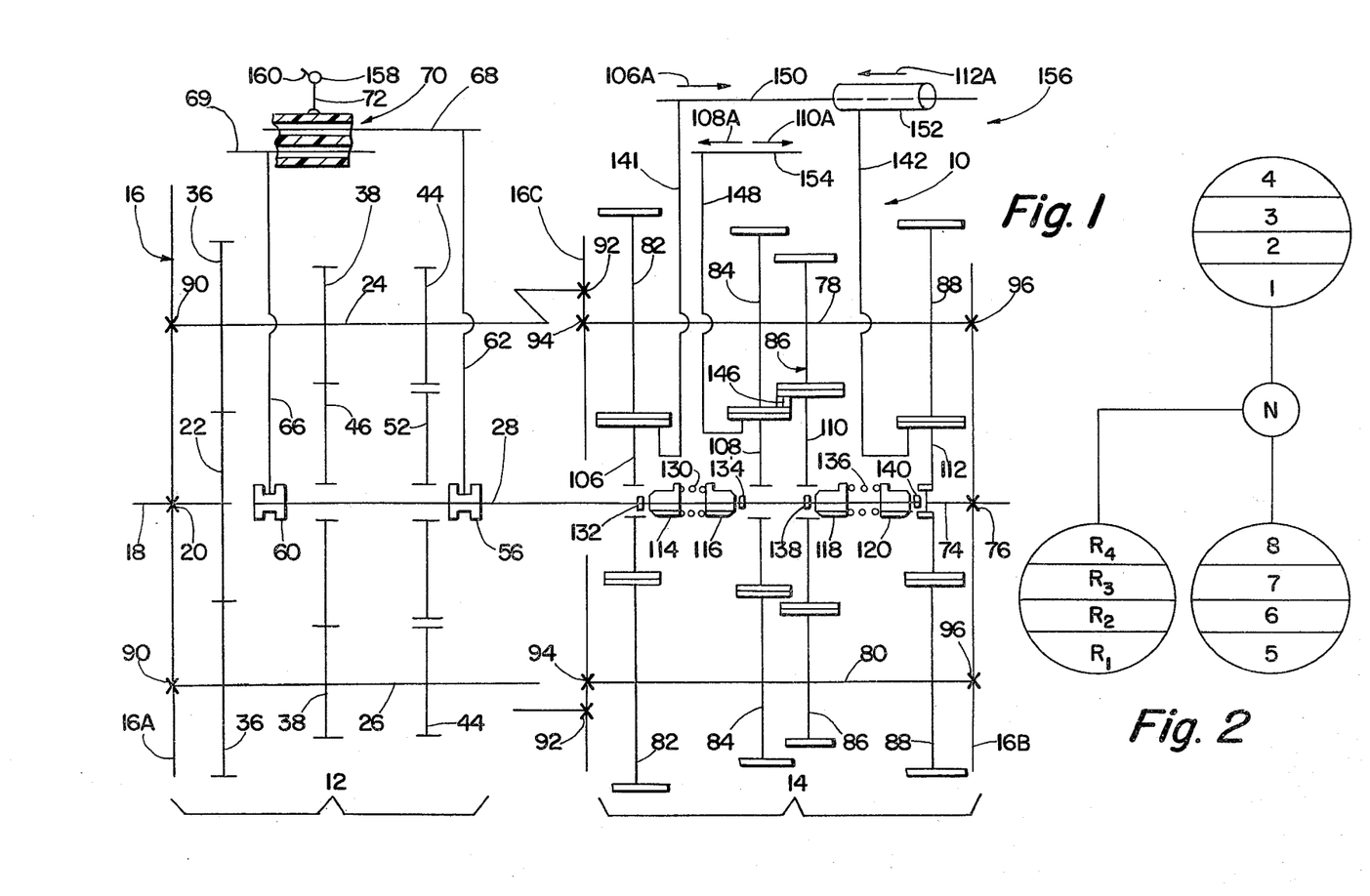
FIG. 1 is a schematic illustration of an eight forward speed compound transmission utilizing the shift control mechanism of the present invention.
FIG. 2 is a schematic illustration of the shift pattern of the of FIG. 1.

Certain terminology will be used in the following description for convenience in reference only and will not be limiting. The words "upwardly", "downwardly", "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "simple transmission" is used to designate a change speed transmission wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps or subdivisions of the gear ratio selected in the main transmission portion. In a splitter type compound transmission, the main transmission section is typically provided with relatively wide steps which are split or subdivided by the auxiliary section. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear", "low gear" and/or "first gear" as used herein shall all designate the gear ratio utilized for lowest forward speed operation in a transmission or transmission section, i.e., that set for gears having the highest ratio of reduction relative to the input shaft of the transmission.

The term "blocked transmission" or "blocked transmission section" shall designate a change gear constant mesh transmission or transmission section wherein a selected one of a plurality of axially movable gears is nonrotatably coupled to a shaft as a result of axial movement of the selected gear from the neutral to the engaging position thereof and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween but not achieved by frictional contact of the selected clutch members sufficient to cause one of the clutch members, and the apparatus associated therewith, to rotate with the other clutch member. Blocked transmissions are illustrated in U.S. Pat. Nos. 3,799,002; 3,924,484; 4,132,122; 4,192,196 and 4,194,410, all of which are hereby incorporated by reference.

Insofar as concerns the integration of the relatively nondeformable blockers into the shiftable change speed auxiliary transmission system of the present invention, the blockers are placed between the two relatively axially slidable clutch portions, or clutch members, of most or preferably all of the auxiliary transmission section positive clutches and the usual friction means are provided for causing the blockers to tend to rotate with one of said members as the clutch members respectively move toward each other during a clutching procedure. One of such clutch members is preferably formed integrally with the selectively axially movable mainshaft gear as internal clutch teeth thereof. As the clutching procedure occurs, as initiated by axial movement of a selected mainshaft gear, the blocker limits such relative axial movement until substantial synchronization between the clutch members involved in a given shift is sensed.

Compound transmissions, especially of the splitter type, are usually designated by an "A×B" notation wherein:

A = the number of selectable forward speeds or power paths in the main transmission section;

B = the number of selectable speeds or power paths in the auxiliary transmission section; and A×B = the total number of available forward transmission speeds.

Accordingly, a twelve speed splitter type compound transmission could be a "6×2", a "4×3", a "3×4" or a "2×6". Due to the difficulty in shifting the auxiliary transmission section in many of the prior art transmissions, it has been conventional practice to provide compound transmissions wherein A was equal to or greater than B.

The present invention, as a result of relatively easy shifting of the auxiliary transmission section, see copending Ser. No. 287,470, filed July 27, 1981, is especially intended for splitter type transmissions having four or more selectable speeds or power paths in the auxiliary section, such as "2×4" eight speed transmissions, "3×4" twelve speed transmissions and/or "4×4" sixteen speed transmissions. The present invention is also especially well suited for use with a four speed simple blocked transmission.

As will be discussed below, such transmissions require less shift lever manipulation, provide a greater number of reverse speed ratios, require less manual synchronizing of the main transmission section and less master clutch manipulation, especially for over the highway operation.

While the present invention is especially well suited for shifting a four or more speed blocked transmission or transmission section, it is also advantageously utilized with any four or more speed transmission or transmission section having selectively axially movable gears.

Figure 3:
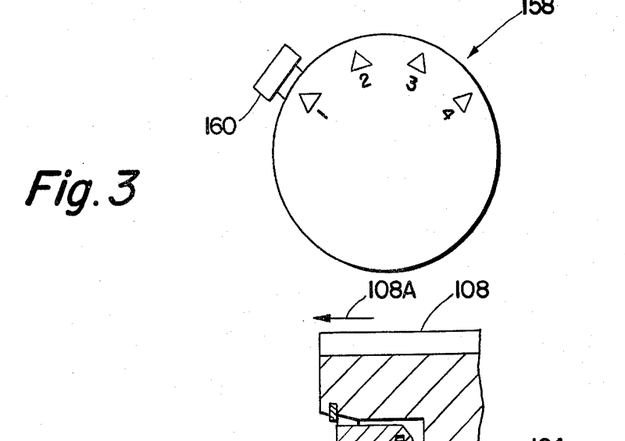
FIG. 3 is a top view of the shift lever knob of the transmission of FIG. 1.

Referring now to FIGS. 1–3, there is schematically illustrated a "2×4", eight forward speed, semi-blocked, splitter type, compound transmission 10. Transmission 10 comprises a main section 12 connected in series with an auxiliary section 14, each of which have a plurality of selectable speeds, or power paths. The main and auxiliary sections are both suitably enclosed by conventional housing means 16 including a forward wall 16A, an end wall 16B and an intermediate wall 16C.

The transmission 10 includes an input shaft 18 supported adjacent its rearward end by a bearing 20 and is provided with an input gear 22 nonrotatably connected thereto, as by splines. The input gear 22 simultaneously drives a plurality of main section countershafts at equal speeds. In the illustrated embodiment, the transmission is provided with two substantially identical main section countershafts, 24 and 26, disposed on diametrically opposite sides of the mainshaft 28, which mainshaft is generally coaxially aligned with the input shaft 18 and is provided with a pilot portion (not shown) on its forward end rotatably received within and supported by the rearward end of the input shaft 18.

The input shaft 18 is normally driven in one direction only by a prime mover, such as a throttle controlled Diesel engine (not shown), through a selectively operated, normally engaged, friction master clutch (not shown) which may have a known clutch-brake associated therewith.

Each of the main section countershafts 24 and 26 is provided with an identical grouping of countershaft gears, 36, 38 and 44 thereon, which groupings form pairs of gears, such as the pair of gears 36, of identical size and number of teeth and disposed on diametrically opposite sides of the mainshaft 28. Countershaft gears 38 and/or 44 may be defined by involute splines formed directly on the main section countershafts.

A plurality of main section mainshaft drive gears 46 and 52 surround the mainshaft 28 and are selectable clutchable thereto, one at a time, by sliding clutch collars as is well known in the art. The main section mainshaft gear 46 encircles the mainshaft 28, is in continuous meshing engagement with, and is floatingly supported by the diametrically opposite pair of countershaft gears, 38 and 38, which mounting means and the special advantages resulting therefrom are explain in greater detail in U.S. Pat. Nos. 3,105,395 and 3,335,616, both assigned to the assignee of this application and hereby incorporated by reference. The mainshaft gear 52 is the reverse gear and is in continuous meshing engagement with the pair of countershaft gears 44 by means of conventional intermediate idler gears (not shown). The forwardmost countershaft gears 36 are continually meshed with and driven by the input gear 22 for causing simultaneous rotation of the countershafts 24 and 26 whenever the input shaft is rotatably driven.

Main section mainshaft gears 46 and 52, and main section countershaft gears 36, 38 and 44, and the idler gears, are all constantly meshed with and driven by the input gear 22 and thus, in combination, form the input gearing of the transmission 10.

As is well known, various abutment rings are preferably provided to axially fix the main section mainshaft gears relative to mainshaft 28.

Sliding clutch collars 56 and 60 are splined to mainshaft 28 for axial movement relative thereto and rotation therewith as is well known in the art.

Sliding clutch 56 is axially slidable by means of shift fork 62 to clutch gear 52 to the mainshaft. Sliding clutch 60 is axially slidable by means of shift fork 66 to clutch gear 46 to the mainshaft or to clutch the input gear 22 (and thus the input shaft 18) to the mainshaft. Shift forks 62 and 66 are attached to shift bars, or rails, 68 and 69, respectively, of a known shift bar housing assembly 70 which is operated by a conventional shift lever 72.

Although the main transmission section 12 is illustrated as a two speed manually shifted transmission, the present invention is also applicable to transmissions wherein the main section is provided with three, four, five or more speeds and/or wherein the shifting mechanisms are of the synchronized or blocked types.

Considering now the splitter auxiliary section 14, the mainshaft 28 extends thereinto and is coaxially arranged with and piloted into an output shaft 74 which is in turn supported within the housing end wall 16B by suitable bearings generally indicated at 76. Said auxiliary section further includes a plurality of substantially identical auxiliary section countershafts 78 and 80 each having an identical grouping of countershaft gears 82, 84, 86 and 88 thereon.

As is known in the art and is illustrated in above-mentioned U.S. Pat. No. 3,105,395, to minimize the axial and transverse dimensions of a twin countershaft type compound transmission, the mainshaft section countershafts, 24 and 26, are displaced by about 15° to 90° from the auxiliary section countershafts. Main section countershafts are supported in housing 16 by bearings 90 and 92 while auxiliary section countershafts, 78 and 80, are supported in housing 16 by bearings 94 and 96.

Three auxiliary section mainshaft gears, 106, 108 and 110 encircle the mainshaft 28 and are constantly meshed with and floatingly supported by the auxiliary countershaft gear pairs 82, 84 and 86, respectively. Output gear 112 is splined to output shaft 74 for axial movement relative thereto and rotational movement therewith. Output gear 112 is constantly meshed with auxiliary countershaft gear pair 88.

Resiliently biased clutch members 114, 116, 118 and 120 are spined to mainshaft 28 and, in combination with blockers (not shown in FIG. 1) provide resilient, blocked clutching apparatus of the type described in U.S. Pat. Nos. 3,799,002, 3,921,469 and 3,924,484 for selectively clutching gears 106, 108, 110 and 112, respectively, one at a time, to mainshaft 28. Clutches 114 and 116 are biased axially apart by spring 130 surrounding the mainshaft and limited in their axial movements by positive stops 132 and 134. Clutch members 118 and 120 are biased axially apart by spring 136 surrounding the mainshaft and limited in axial movement by stops 138 and 140.

Gear 106 is axially movable in the direction of arrow 106A by shift fork 141 to cause the clutch teeth thereof to be engaged the clutch teeth of resiliently biased jaw clutch member 114. Gear 112 is axially movable in the direction of arrow 112A by shift fork 142 to cause the clutch teeth thereof to be engaged by the clutch teeth of resiliently biased jaw clutch member 120. Mainshaft gears 108 and 110 are joined for joint axial movement and independent rotation by ring 146 and are axially movable by shift fork 148 in the direction of arrow 108A to cause gear 108 to engage the resiliently biased clutch collar 116 or in the direction of arrow 110A to cause gear 110 to engage the resiliently biased jaw clutch member 118. It is important to note that gears 106 and 112 are independently axially movable relative to each other and to gears 108 and 110 while gears 108 and 110 are interconnected for joint axial movement.

Shift fork 141 is carried by auxiliary shift rod 150, shift fork 142 is carried by auxiliary shift rod 152 which is concentric with and axially independent of shift rod 150, while shift fork 148 is carried by auxiliary shift rod 154. Shift rods 150, 152 and 154 form a portion of auxiliary shift bar valve assembly 156 to be discussed in greater detail below. Auxiliary shift valve assembly 156 is a remote, slaved shifting device controlled by a master device or master valve, 158 (see FIG. 3), usually attached to, or integral with, the gear shift lever 72. Typically, master control selector knob 158 will include a movable member, such as button 160, or a toggle lever, having four unique positions ("1", "2", "3" and "4") by which any one of the auxiliary section power paths, or speeds, may be selected. Typically, the auxiliary section master control 158, and the servo mechanism 156, is fluid and/or electrically operated and suitable master-slave valving and/or circuitry is provided.

The yieldable clutch structures are arranged between the shiftable mainshaft gears in the auxiliary section and are provided with resilient means for urging engagement thereof as set forth in detail in the above mentioned U.S. Pat. Nos. 3,799,002 and 3,983,979. While clutch means utilizing relatively nondeformable blockers of the prior art are not identical with each other, they are generally similar insofar as the present invention is concerned. Also, as may be seen by reference to U.S. Pat. No. 3,799,002, the clutch structures may be provided without the necessity of providing blockers between the clutch teeth carried by the axially movable gears 106, 108, 110 and 112 and the resiliently biased clutch members 114, 116, 118 and 120, respectively.

Figure 6:
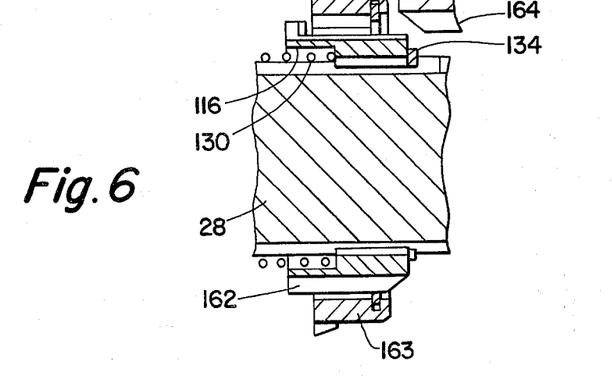
FIG. 6 is a partial sectional view of the blocked jaw clutch structure of the preferred embodiment of the present invention.

A blocked jaw clutch assembly including auxiliary mainshaft gear 108 and jaw clutch 116 may be seen by reference to FIG. 6. As is shown, spring 130 biases jaw clutch member 116 and clutch teeth 162 carried thereby toward the internal clutch teeth 164 carried by gear 108. Axial movement of clutch collar 116 is limited by stop 134. A blocker 163 is carried by jaw clutch member 116 for rotation therewith with a degree of rotational freedom relative thereto as is described in greater detail in U.S. Pat. Nos. 3,799,002; 3,924,484 and 3,921,469. The blocker, upon relative axial movement of gear 108 in the direction of arrow 108A will prevent engagement of the teeth 164 and 162 until a crossing of synchronous occurs. In nonsynchronous conditions, the blocker will cause the jaw clutch member 116 to move leftwardly against the bias of spring 130 to preload the jaw clutch member 116 for resilient engagement of teeth 162 and 164 upon a crossing of synchronous thereof.

The shift pattern for transmission 10 may be seen by reference to FIG. 2.

Figure 4:
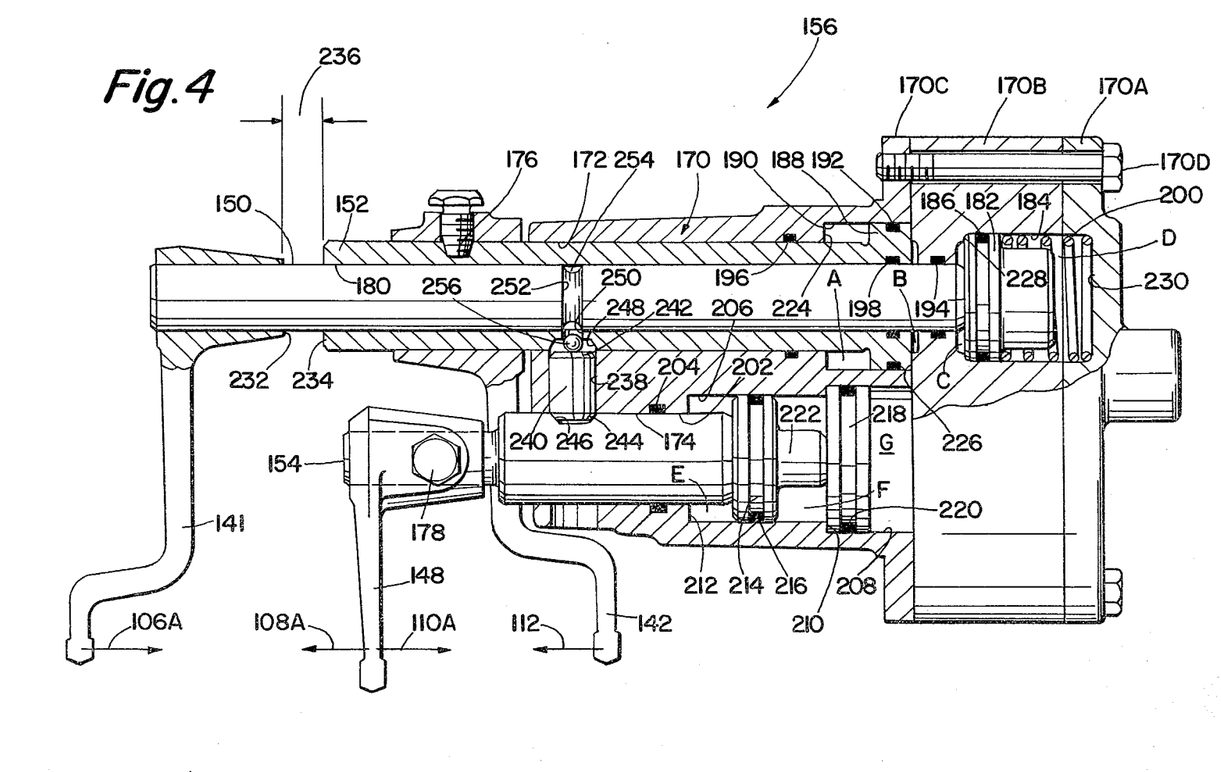
FIG. 4 is a plan view, partially in section, of the shift control mechanism of the present invention.

Auxiliary section shift assembly 156 may be seen in greater detail by reference to FIG. 4. Assembly 156 includes a first shift fork 141 received in a groove in auxiliary mainshaft gear 106 for axially moving gear 106 in the direction of arrow 106A from the position shown, a second shift fork 142 received in a groove in auxiliary mainshaft gear 112 for axially moving gear 112 in the direction of arrow 112A from the position shown and a third shift fork 148 received in a groove in either gear 108 or gear 110 for moving the axially interconnected gears 108 and 110 in the axial direction of arrows 108A or 110A from the position shown.

Shift assembly 156 includes an auxiliary servo, or slave valve, shift rod cylinder housing 170 which may be a multi-pieced structure comprising structures 170A, 170B and 170C assembled by means of fasteners 170D (only one of which is shown). Slave valve and shift rod cylinder housing 170 defines a first bore 172 and a second bore 174 which are spaced and generally parallel. Housing 170 is mountable to transmission housing 16 in the usual manner.

Shift fork 141 is attached to shift rail or rod 150 for axial movement therewith. Shift fork 142 is attached, as at 176, to shift rod 152 for axial movement therewith. Shift fork 148 is attached to shift rod 154, as at 178, for axial movement therewith.

Shift rods 150 and 152 are slidably and sealingly received in bore 172 of shift rod housing 170. Shift rod 152 is concentric with shift rod 150 and receives shift rod 150 in an axially extending bore 180 therein. Shift rods 150 and 152 are independently axially movable from the position shown, that is rod 150 in the direction of arrow 106A and shift rod 152 in the direction of arrow 112A.

Shift rod 150 includes a piston portion 182 which is received in an enlarged diameter cylinder portion 184 of bore 172. Piston portion 182 of shift rod 150 carries a seal 186 for slidably and sealingly engaging the inner radial wall of cylinder portion 184. Shift rod 152 includes a piston portion 188 which is received in an enlarged diameter cylinder portion 190 of bore 172. Piston portion 190 carries a seal 192 for slidably and sealingly engaging the inner radial wall of cylinder portion 190. A seal 194 in the inner bore of wall portion 170B of housing 170 sealingly and slidably engages shift rod 150 to fluidly isolate cylinder portion 184 from cylinder portion 190. A further seal 196 in bore 172 slidingly and sealingly engages rod 152 to isolate cylinder portion 190 from atmosphere.

As may be seen, piston portion 188 of rod 152 divides cylinder portion 190 into a first chamber A and a second chamber B. The surface area of piston 188 exposed to chamber A is less than the surface area of piston 188 exposed to chamber B. Piston portion 182 of rod 150 divides cylinder portion 184 into a third chamber C and a fourth chamber D. A seal 198 in bore 180 slidably and sealingly engages rod 150 to seal chamber B from atmosphere. A biasing means, such as compression spring 200 in chamber D engages piston portion 182 and provides a constant bias on the shift rod 150 to the left or opposite the direction of arrow 106A.

Shift rod 154 is slidably and sealingly received in bore 174 in housing 170. Bore 174 includes a reduced diameter portion 202 having a seal 204 for slidably and sealingly engaging rod 154, a first enlarged diameter portion 206 and a second enlarged diameter portion 208.

Bore portions 206 and 208 define a shoulder 210 at the intersections thereof and the bore portions 202 and 206 define a shoulder 212 at the intersections thereof. Shift rod 154 includes a piston portion 214 which is slidably and sealingly received in the first enlarged diameter portion 206 and which carries a seal 216 for slidably and sealingly engaging the inner wall of first enlarged diameter portion 206. A piston disk 218 carrying a seal 220 is slidably and sealingly received in the second enlarged diameter portion 208 of bore 174. Piston portion 214 includes an abutment boss 222 extending rightwardly which will engage disk 218 upon rightward movement of shift rod 154. Of course, abutment boss 222 could be fixed to disc 218 for axial movement therewith.

A fifth chamber E is defined by piston portion 214 of shift rod 154 and the first enlarged diameter portion 206. A sixth chamber F is defined by the piston portion 214, disk 218 and enlarged diameter portions 206 and 208 of bore 174. A seventh chamber G is defined by disk 218 and the rightward end of enlarged diameter portion 208 of bore 174. The surface area of piston portion 214 of shift rod 154 exposed to fluid pressure in chamber E is smaller than the surface area of piston portion 214 exposed to fluid pressure in chamber F. The surface area of disc 218 exposed to fluid pressure in chamber G is greater than the surface areas of piston portion 214 exposed to fluid pressure in chambers E or F.

As may be seen, axial movement of piston portion 188 of shift rod 152 is limited by the shoulders 224 and 226 defining cylinder portion 190 of bore 172. Axial movement of piston portion 182 of shift rod 150 is limited by shoulder 228 and end wall 230 of cylinder portion 184. Axial movement of piston portion 214 of shift rod 154 is limited by shoulder 212 and the engagement of abutment boss 222 with disk 218. Axial movement of disk 218 to the left is limited by shoulder 210.

Various fluid fittings and connectors, fluid passages, valve members and the like (not shown) are provided for selectively connecting predetermined combinations of the various chambers A, B, C, D, E and/or F with a common source of pressurized fluid (not shown) or to atmosphere.

Figure 5:
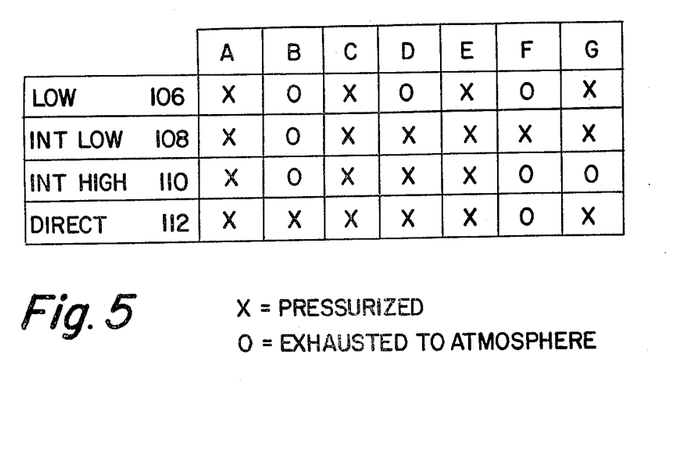
FIG. 5 is a table illustrating the pressurizing of the various chambers of the mechanism of FIG. 4 for each selected shifting of the auxiliary transmission section of FIG. 1.

The condition of each of the various chambers for selective engagement of each of the auxiliary section mainshaft gears, that is either pressurized ("X") by connection to a source of pressurized fluid or vented ("O") by being exhausted to atmosphere, may be seen by reference to FIG. 5. Each of the chambers, when pressurized, is connected to the same source of pressurized fluid and will thus each be at an equal or substantially equal pressure.

To achieve low speed operation of auxiliary transmission section 14, that is to cause engagement of gear 106 by axially moving gear 106 in the direction of arrow 106A, chamber A is pressurized and chamber B is exhausted resulting in shift rod 152 and shift fork 142 carried thereby being in the rightwardmost position as is shown. Chamber C is pressurized and chamber D is exhausted causing shift rod 150 and shift fork 141 carried thereby to be moved rightwardly against the bias of spring 200 in the direction of arrow 106A causing gear 106 to move axially for engagement by clutch member 114. Chamber E is pressurized and chamber F is exhausted causing shift rod 154 to tend to move to the right which motion is prevented by pressurization of chamber G causing disk 218 to move to the left into abutment with shoulder 210 and abutment boss 222. As disk 218 has a larger surface area than the effective surface area of piston member 214 acted upon by pressurized fluid in chamber E shift rod 154 and shift fork 148 carried thereby will remain in the shown disengaged position. It is noted that the force of pressurized fluid in chamber C acting upon the leftwardly facing surface of piston member 182 is sufficient to overcome the bias of spring 200.

To achieve a direct drive connection of auxiliary section 14, that is to engage gear 112 with mainshaft 28, chamber A and B are both pressurized. As the surface area of piston portion 188 of shift rod 152 acted upon by the pressurized fluid in chamber B is greater than the surface area of piston portion 188 acted upon by the pressurized fluid in chamber A, the shift rod 152 and shift fork 142 will move to the right, or the direction of arrow 112A. Chamber C and D are both pressurized. As the surface area of piston portion 182 acted upon by the pressurized fluid in chamber C is not greater than the surface area of piston portion 182 exposed to fluid pressure in chamber D, the biasing force of spring 200 will result in shift rod 150 and shift fork 141 remaining in the neutral position as illustrated in FIGS. 1 and 4. Chambers E and G are pressurized and chamber F is vented to atmosphere to retain shift rod 154 in the neutral position as was discussed above in connection with engagement of gear 106.

To achieve intermediate low speed operation of auxiliary section 14, that is engagement of gear 108 with mainshaft 28, or intermediate high speed operation of auxiliary section 14, that is engagement of gear 110 with mainshaft 28, chamber A is pressurized, chamber B is vented and chambers C and D are pressurized. Pressurization of chamber A and venting of chamber B will result in shift rod 152 and shift fork 141 carried thereby remaining in the neutral position as has been discussed above. Pressurization of chambers C and chamber D will result in shift rod 150 and shift fork 141 carried thereby remaining in the neutral position under the bias of spring 200 as has been discussed above. To achieve engagement of gear 108 it is necessary to move shift rod 154 and shift fork 148 carried thereby leftwardly in the direction of arrow 108A from the position shown in FIGS. 1 and 4. To accomplish this chambers E, F and G are all pressurized. As the surface area of piston portion 214 acted upon by fluid pressure in chamber F is greater than the surface area acted upon by fluid pressure in chamber E the pressurization of both chambers E and F will result in a leftward movement of shift rod 154 to engage gear 108. Pressurization of chamber G will simply result in disk 218 moving leftwardly against shoulder 210. To achieve intermediate high speed operation of auxiliary section 114 it is necessary to move shift rod 154 and shift fork 148 carried thereby rightwardly in the direction of arrow 110A to cause auxiliary mainshaft gear 110 to become engaged with mainshaft 28. To achieve this, chamber E is pressurized and chambers F and G are vented. Pressurization of chamber E will result in fluid pressure in chamber E acting upon the leftwardly facing surface of piston portion 214. As chambers F and G are vented, the pressure in chamber E will result in the piston portion and the disk moving rightwardly in the direction of arrow 110A.

It is noted, that by providing a greater surface area on the rightward face of piston portion 188 acted upon by fluid pressure in chamber B on then the leftwardly facing surface acted upon by fluid pressure in chamber A and by providing a greater surface area on the rightwardly facing surface of piston portion 214 acted upon by fluid pressure in chamber F then the leftwardly facing surface of piston portion 214 acted upon by fluid in chamber E, and by providing biasing spring 200, three of the chambers, namely chambers A, C and E are constantly pressurized. Accordingly, complicated valving and exhaust mechanisms need not be provided for these chambers A, C and E, considerably simplifying the valving arrangement of the auxiliary shifting mechanism 156. It is recognized, of course, that by providing differing surface areas on the various faces of the piston portions and/or differing biasing means and/or interconnecting selected chambers, alternate schemes for pressurization of the various chambers to achieve the desired movements of the various shift rails could be obtained. For example, chambers C and G could be fluidly interconnected which would result in chamber C being exhausted when engagement of intermediate high gear 110 is selected which would not effect the operation of shifting mechanism 156.

As has been discussed above, it is important to assure that only one of the auxiliary mainshaft gears, 106, 108, 110 or 112, are engaged to mainshaft 28 at any given time. To assure that only one of the mainshaft gears in auxiliary section 14 is engaged at a time, the following positive mechanical interlock structure is provided. The interlock structure will provide positive protection in the event one of the auxiliary mainshaft gears is slow in becoming disengaged, one of the piston portions on the shift rods becomes hung up, blockage occurs in one of the pressurized fluid or pressure venting fluid passages or the like.

Shift fork 141 mounted on shift rod 150 presents a leftwardly facing surface or shoulder 232 having an outer radial diameter or other dimension greater than the diameter of bore 180 in shift rod 152. The outer opening of bore 180 in shift rod 152 presents a leftwardly facing surface or shoulder 234. Surfaces 232 and 234 are designed for abutting engagement and, in the neutral position of shift rods 150 and 152, are separated by an axial distance 236 which is equal to or slightly greater than the axial movement required of shift forks 141 and 142 to cause engagement of gears 106 and 112, respectively. Accordingly, rightward movement of shift rod 150 in the direction of arrow 106A will cause surface 232 to come into engagement with surface 234 and prevent leftward movement of shift rod 152 in the direction of arrow 108A. Similarly, leftward movement of shift rod 152 in the direction of 108A will result in surface 234 coming into engagement with surface 232 and preventing rightward movement of shift rod 150 in the direction of 106A. Accordingly, by means of abutment surfaces 232 and 234, it is impossible for shift forks 141 and 142 to move their respective gears, 106 and 112 into simultaneous engagement.

Housing 170 is provided with a bore 238 intersecting bores 172 and 174, respectively, and having an axis generally perpendicular thereto. A detent pin 240 having inwardly tapered upper 242 and lower 244 ends is slidably received in bore 238. Shift rod 154 has a groove 246 formed on the outer periphery thereof having inwardly tapered surfaces 247 generally complimentary with the inwardly tapered surfaces on end 244 of detent pin 240 and aligning with bore 238 in the neutral or centered position of shift rod 154. Shift rod 152 has a detent groove 248 having inwardly tapered side walls 249 generally complimentary with the inwardly tapered ends 242 of detent pin 240 and aligning with bore 238 in the neutral position of shift rod 152. Grooves 246 and 248 are of a substantially equal depth and may be annular. Detent pin 240 has an axial length 241 generally equal to the length of bore 238 plus the depth of either groove 246 or 248. Shift rod 152 also has a radially extending bore 250 generally centered in groove 248 and of a smaller diameter than bore 238. Shift rod 150 has an annular groove 252 having a generally concave cross-sectional shape 254 with a radius generally similar to the radius of bore 250 and aligning therewith in the neutral position of shift rods 150 and 152. A detent ball 256 is received in bore 250 and has a radius slightly less than the radius of bore 250. The diameter of detent ball 256 is slightly less than the thickness 257 of the walls of shift rod 152. The diameter of detent ball 256 is generally equal to the axial length of bore 250 added to the depth of groove 252.

Figure 7:
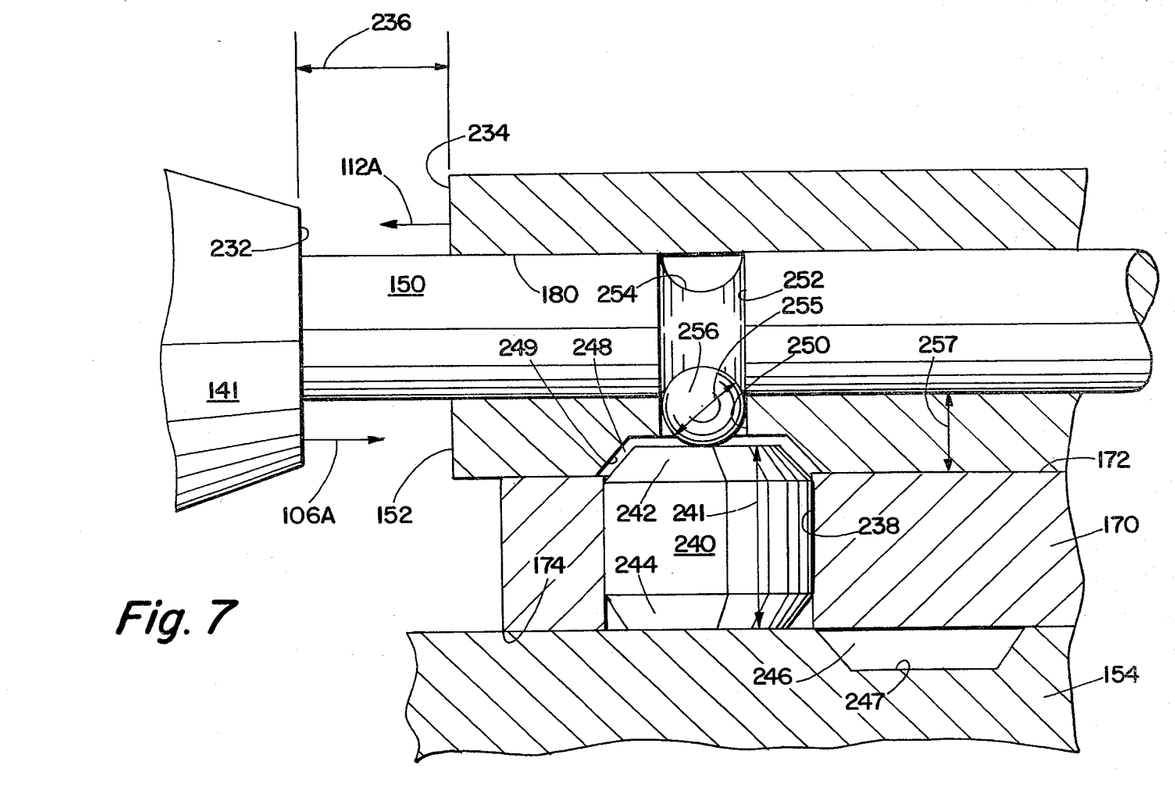
FIG. 7 is an enlarged partial sectional view of the interlock structure of the present invention.

Movement of shift rod 154 and shift fork 148 carried thereby in the direction of arrow 108A or the direction of arrow 110A to engage gear 108 or gear 110, respectively, will result in detent pin 240 being forced axially upward in bore 238 and into groove 248 in shift rod 152 which will cause ball 256 to move upwardly in bore 250 to engage groove 254 in shift rod 150 thus axially locking both shift rods 152 and 150 in the neutral position. FIG. 7 illustrates the rightward movement of shift rod 154 in the direction of arrow 110A and the locking of shift rods 150 and 152 in the neutral positions thereof by detent pin 240 and detent ball 256.

Movement of shift rod 150 and shift fork 141 carried thereby in the direction of arrow 106A to engage gear 106 with mainshaft 28 will result in surfaces 232 and 234 engaging thus locking shift rod 152 in the neutral position. Rightward movement of shift rod 150 will also force detent ball 256 downwardly into bore 250 and thus force detent pin 240 axially downward in bore 238 and into groove 246 of shift rod 154 thus locking shift rod 154 in the axially centered neutral position. Movement of shift rod 152 and shift fork 142 carried thereby in the direction of arrow 112A to engage mainshaft gear 112 with mainshaft 28 will result in surface 234 engaging surface 232 to axially fix the position of shift rod 150 in the neutral position. Leftward movement of shift rod 152 will also cause detent pin 240 to be forced axially downward in bore 238 to enter groove 246 in shift rod 154 to lock shift rod 154 in the axially centered neutral position. Ball 256 which has a diameter slightly less than the thickness 257 of the wall of shift rod 152 will ride between shift rod 150 and the inner radial wall of bore 172.

It may thus be seen that a positive mechanical interlock structure is provided which prevents engagement of more than one of the mainshaft gears 106, 108, 110 and 112 at a time. The mechanical interlock structure will prevent axial movement of any of the shift rods 150, 152 or 154 unless the other two of the shift rods are in the neutral position. The above is a relatively simple mechanical interlock structure requiring no biasing means such as springs or the like. The above described interlock structure provides a relatively simple positive interlock for three independently axially movable shift rods, 150, 152 and 154, two of which shift rods, 150 and 152, are concentric and telescopically related and received in a common bore 172 in a shift rod cylinder housing 170.

Although this invention has been described in its preferred form with a certain degree of particularity, it is understood that present disclosure of the preferred form is for descriptive purposes only and that various modifications and changes in the detailed construction and arrangement of the parts may be resorted to without departing from the spirit and the scope of the invention as claimed.

We claim:

1. A shift rod housing assembly comprising:

a housing defining a first and a second generally parallel axially extending bores;

a first shift fork movable from a nondisplaced position, in a first axial direction only, a predetermined axial distance to a predetermined displaced postion, said first shift fork carried by a first shift rod for axial movement therewith, said first shift rod slidably received in said first bore and having an axially extending third bore therethrough;

a second shift fork movable from a nondisplaced position, in a second axial direction only, said predetermined axial distance to a predetermined displaced position, said second shift fork carried by a second shift rod for axial movement therewith, a portion of said second shift rod slidably received in said third bore in said first shift rod and another portion of said second shift rod extending in said first axial direction from said third bore in said first shift rod and carrying an abutment surface having a larger outer dimension than the inner diameter of said third bore, said abutment surface, in the axial positions of said first and second shift rods corresponding to the nondisplaced position of said first and second shift fork, being spaced from the opening to said third bore by an axial distance generally equal to said predetermined axial distance whereby axial displacement of either one of said first and second shift rods to an axial position corresponding to the predetermined displaced position of the shift fork carried thereby will result in said abutment surface being adjacent to or engaging the opening to said third bore thereby positively preventing simultaneous displacement of said first and second shift forks to the predetermined displaced positions thereof;

a third shift fork movable from a nondisplaced position in either one of the first or second axial directions to either of two predetermined displaced positions, said third shift fork carried by a third shift rod for axial movement therewith, said third shift rod slidably received in said second bore;

means associated with said housing for selectively displacing any selected one of said first, second and third shift rods from the nondisplaced position thereof to the predetermined displaced positions thereof independently of displacement of the other two of said first, second and third shift rods; and positive mechanical interlock means operable in combination with said abutment surface for positively preventing movement of any one of said first, second and third shift rods to the predetermined displaced positions thereof unless the other two of said first, second and third shift rods are in the nondisplaced positions thereof.

2. The assembly of claim 1, wherein said housing additionally comprises a fourth bore extending from said first bore to said second bore and substantially normal thereto, said first and third shift rods have inwardly tapered grooves formed therein which align with said fourth bore in the nondisplaced positions of said first and third shift rods, said first shift rod defines a fifth bore generally centered in the inwardly tapered groove therein and extending from the bottom of said groove to the third bore, and said second shift rod has a groove on the outer periphery thereof having a generally concave cross section, said groove aligning with said fifth bore in the nondisplaced positions of said first and second shift rods, said assembly additionally comprising a detent pin having inwardly tapered ends at the axial ends thereof slidably received in said fourth bore, said detent pin having an axial length generally equal to the axial length of said fourth bore added to the depth of either one of the grooves formed in said first and third shift rails, and a detent ball having a diameter less than the thickness of the wall of said first shaft and a radius slightly less than the radius of said fifth bore received in said fifth bore, the diameter of said detent ball generally equal to the axial length of said fifth bore added to the depth of said concave shaped groove formed in said second shift rail.

3. The assembly of claim 2, wherein said third shift fork is axially interposed said first and second shift forks.

4. The assembly of claims 1 or 2, wherein said means to selectively axially move said shift rods is a remotely controlled fluid actuated device.

5. The assembly of claims 1 or 2, wherein said housing is a shift rod cylinder housing, said first bore defines a first cylinder portion and a second cylinder portion therein and said second bore defines a third cylinder portion therein and wherein said first shift rod includes a first piston portion slidably and sealingly received in said first cylinder portion, said second shift rod includes a second piston portion slidably and sealingly received in said second cylinder portion and said third shift rod includes a third piston portion slidably and sealingly received in said third cylinder portion.

6. The assembly of claim 5, wherein said first and second shift rods are constantly biased to the nondisplaced positions thereof and selectively applied fluid pressure acting upon the piston portions thereof is affective to overcome said constant bias for selective displacement of said first and second shift rods.

7. The assembly of claim 6, wherein one of said first and second shift rods is biased to the nondisplaced position thereof by a spring, and the piston portion of the other of said first and second shift rods is provided with a smaller surface and a larger surface opposed to said smaller surface and said other shift rod is biased to the nondisplaced position thereof by constant fluid pressure acting on the smaller of the two opposed surfaces of the piston portion thereof.

* * * * *